United States Patent
Pastorelli et al.

(10) Patent No.: US 9,020,856 B2
(45) Date of Patent: Apr. 28, 2015

(54) LICENSE COMPLIANCE MANAGEMENT

(75) Inventors: Bernardo Pastorelli, L'Aquila (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 12/364,948

(22) Filed: Feb. 3, 2009

(65) Prior Publication Data
US 2009/0198543 A1 Aug. 6, 2009

(30) Foreign Application Priority Data

Feb. 4, 2008 (EP) ..................................... 08150997

(51) Int. Cl.
  G06F 21/00 (2013.01)
  G06F 21/12 (2013.01)
  G06Q 10/10 (2012.01)
(52) U.S. Cl.
  CPC ...... *G06F 21/121* (2013.01); *G06F 2221/0775* (2013.01); *G06Q 10/10* (2013.01)
(58) Field of Classification Search
  CPC ....................................................... G06F 11/34
  USPC ....................................................... 705/50–79
  See application file for complete search history.

(56) References Cited

U.S. PATENT DOCUMENTS

| | | | | |
|---|---|---|---|---|
| 5,825,883 A * | 10/1998 | Archibald et al. | ............... | 705/53 |
| 6,240,167 B1 * | 5/2001 | Michaels | ................. | 379/106.03 |
| 7,233,918 B1 * | 6/2007 | Ye et al. | ........................... | 705/30 |
| 7,571,195 B2 * | 8/2009 | Billingsley et al. | ................... | 1/1 |
| 2003/0060188 A1 * | 3/2003 | Gidron et al. | ................. | 455/408 |
| 2003/0084343 A1 * | 5/2003 | Ramachandran et al. | ..... | 713/201 |
| 2003/0232616 A1 * | 12/2003 | Gidron et al. | ................. | 455/406 |
| 2004/0133801 A1 * | 7/2004 | Pastorelli et al. | ............. | 713/200 |
| 2006/0140370 A1 * | 6/2006 | Agarwal et al. | .......... | 379/114.28 |
| 2008/0148253 A1 * | 6/2008 | Badwe et al. | ................. | 717/174 |
| 2008/0243699 A1 * | 10/2008 | Hilerio et al. | .................. | 705/59 |
| 2009/0055835 A1 * | 2/2009 | Zhu | ................. | 718/105 |
| 2009/0198543 A1 * | 8/2009 | Pastorelli et al. | ................. | 705/7 |

* cited by examiner

*Primary Examiner* — Jacob C. Coppola
(74) *Attorney, Agent, or Firm* — D'Ambrosio & Menon, PLLC; Usha Menon

(57) ABSTRACT

Methods, computer program products and systems for determining the level of use of a program associated with a license, by one or more agents, for comparison with a predetermined licensed level of use. In one embodiment of the invention, the method comprises the steps of collecting initial data from the one or more agents associated with a metric indicative of use of the program during a first predetermined time period, calculating the metric to determine a level use of the program for the first predetermined time period, receiving new data from one or more agents associated with the metric of usage of the program, where the new data arrives after the first predetermined time period, estimating a new value of the metric to determine a approximate level of use for a second predetermined time period from the original data, the metric and the new data and in response to a trigger event, recalculating the metric to produce a final value of the metric based on the original data and the new data to provide an indication of the level of use of the program.

13 Claims, 2 Drawing Sheets

LICENSE COMPLIANCE MANAGEMENT

PRIORITY

This application is based on and claims the benefit of priority from European Patent Application EP08150997.8 filed Feb. 4, 2008.

BACKGROUND

Computer software is generally subject to a license which gives rights to a user in relation to the software. The license may be free or may be subject to payment or royalties based on use of the software by the individual, or by any other entity such as a company, government department etc. License compliance management systems allow the owner of a software to be able to monitor and take account of use of the software by an entity.

SUMMARY OF THE INVENTION

License compliance management systems poll use in order to determine which software is located on which computers and to determine the amount the software is used on any such computer. The information relating to software location and usage is then used to determine the appropriate license level of the entity. Then if necessary, a comparison is made between the license level based on the poll and the license level to which the entity has committed. If there are any differences between the license levels in this comparison the software owner can adjust the payments required from the entity and propose new license agreements that embrace the appropriate levels. In this way the software owner can ensure that they are appropriately remunerated for the software they provide.

A license compliance management tool generally carries out the poll and comparison by means of two computations. The first is required to understand if an entity is using software without having a license, or having a license that does not cover the particular software usage. The second computation is required to understand the amount of times an entity is using licensed software, and thus the related license, in order to check the license is at the required level. The first computation requires choosing an appropriate license for the software installed. When a license is not available the license compliance management system records the software installation as unlicensed. If a license is available, the tool may store the association between the software installation and the license.

The second computation processes all the licenses to determine an appropriate metric based on the number of software instances associated to a license in order to determine if the license is being correctly used or overused. This second computation process generally requires batch processing. The tool can start completing the license consumption when all the events related to a license are available.

The need to wait for all events to be available may result in a delay in determining what level of license is being used by a particular entity: if events arrive after the computation has started, there is often no available process to update the license consumption. In addition, entities using mobile computers which are not always connected to a home server where the computations and analyses are carried out can present further problems. The use and installation events on mobile computers can only be determined when they are connected to the network of the entity. As a result, a license compliance management system will generally wait several days before determining the usage for a particular day in order to ensure that all the late information and information from mobile computers is considered. However, even this does not ensure that all events will have been transmitted from all computers, so late arriving events can still occur and will not be included in the computation.

A possible alternative is recalculating license consumption each and every day. However, this would require considerable effort in terms of processing and managing the process. In addition, a high water mark (HWM) computation may also be required, which would again augment the effort required for the licensee.

In one embodiment of the invention, the level of use of a program associated with a license may be determined. The method may further comprise the steps of collecting initial data from the one or more agents associated with a metric indicative of use of the program during a first predetermined time period, calculating the metric to determine a level use of the program for the first predetermined time period, receiving new data from one or more agents associated with the metric of usage of the program, where the new data arrives after the first predetermined time period, estimating a new value of the metric to determine a approximate level of use for a second predetermined time period from the original data, the metric and the new data and in response to a trigger event and recalculating the metric to produce a final value of the metric based on the original data and the new data to provide an indication of the level of use of the program.

Implementations of the method discussed above may include a computer-implemented method, a system, or a computer program product. The details of one or more embodiments of the invention are set forth in the accompanying drawings and the description below. Other features of the invention will be apparent from the description and drawings, and from the claims.

DETAILED DESCRIPTION

Exemplary methods, systems, and computer products for determining the level of use of a program associated with a license are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

Figure 1:
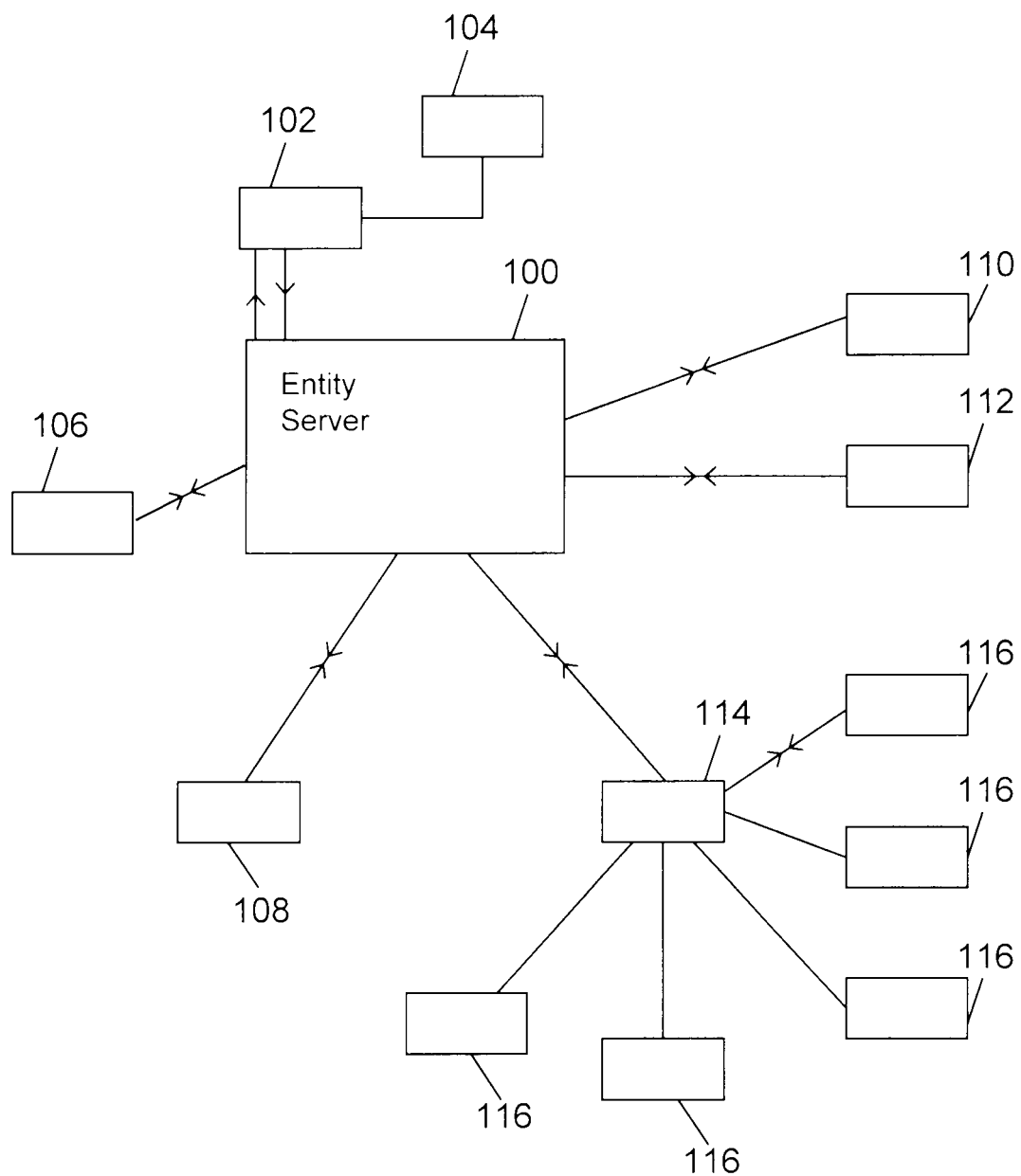
FIG. 1 is a representational block diagram of one embodiment of the invention.

Referring initially to FIG. 1, a simplified block diagram is shown. The diagram includes an entity server 100 connected to a server 102 of a software owner. The server 102 may include or be connected to a license consumption management system (LCMS) 104. The entity server 100 is connected to a plurality of agents or computers shown as 106, 108, 110, and 112. In addition, the entity server may be connected to a mobile server 114. Any mobile agents or computers 116 may access the entity server either through the mobile server or in any other way. It will be appreciated that the number of computers or servers connected to the entity server is not limited in any way and FIG. 1 is merely an example.

Figure 2:
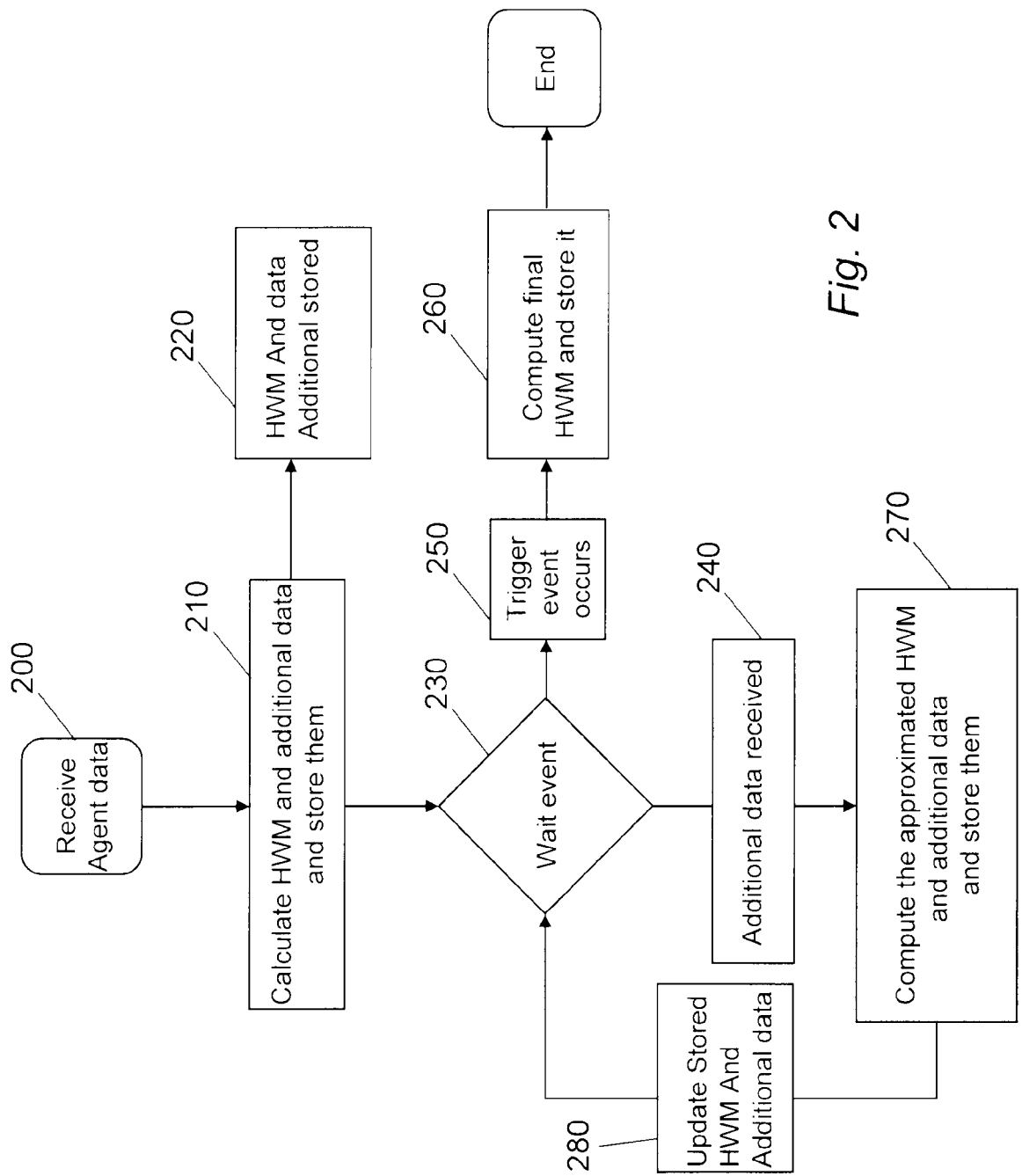
FIG. 2 is a flow chart of an embodiment of the invention.

Referring now to FIG. 2, a flow chart of the method associated with one embodiment of the invention is shown. The entity server receives from one or more agents initial usage data relating to the usage of one or more software products. This is shown in 200. The calculation of a maximum value for the concurrent usage of a software program may occur 210, for example, on a daily basis or any other basis. The maximum value may be a daily High Water Mark (HWM) related to agent use or a different type of HWM. These different examples include a HWM of the capacity of the server or servers, details relating to HWM for a specific type of software or application, or any other appropriate measure. In addition, a metric other than HWM may be used if appropriate. In order to capture the necessary information and process this appropriately, the steps in relation to HWM proceed as follows.

At the end of the day, a HWM value for the day is determined 210. The HWM is used as a measure of software usage for many software owners. The software owners may then charge the entity based on the maximum usage of a particular piece of software in a specific time period, for example, the software usage is typically measured on a per day basis. Thus, if the software in question is used on ten computers between 00:00 hrs and 10:00 hrs, on twenty computers between 10:00 hrs and 14:00 hrs, on fifty computers between 14:00 hrs and 15:00 hrs, and finally on twenty computers between 15:00 hrs and 23:59 hrs, the entity may be charged for fifty uses of the software on the day in question. In other words, the entity may be charged for the maximum use even if this maximum occurred for only one hour during the day in question.

Accordingly, the HWM is essentially the peak of a particular function. The value of HWM can be determined in many different ways. All the software use from a particular time period, for example a day, is downloaded from an appropriate location and associated with two events. The first event is the beginning time of the use and the second event is the end time of the use. Having obtained the set of all events they can be ordered based on the time they occurred and then processed in order of increasing time. The server then maintains two counters, the current value and the HWM, both of which are initially zero. If the event is the first event the current counter is incremented and compared to the HWM. If the current counter is higher than the HWM, the HWM is set to equal the current counter. If the event is the second event, the counter is decremented. Once the server has processed all the events, the HWM counter contains the HWM of the current software use in that particular time period.

The exact time or moment for the determination of the HWM may be varied either based on time or some other reason. This will provide more time for the agents to send the required data to the entity server. As previously mentioned, this may be particularly the case for agents connected via portable computers and computers that may be disconnected from the network for other reasons. The delay in determining the HWM may be that the HWM calculated today is that of yesterday or the delay may be longer if deemed necessary.

The results are stored for the day in question after they have been determined 220. The results are stored in the form of the HWM plus additional data. The additional data may be used in the event that a recalculation is needed for one reason or another. For example, recalculation may be required as agents send additional usage data for a day that has already been calculated.

The entity server then waits for one of two events to occur 230. The first event is the arrival of additional information for the day that has just been calculated 240. The second event is a triggering event, for example that a predetermined amount of time has elapsed since the calculation 250. The trigger event may comprise other alternatives to a time delay, for example a user initiated trigger etc. When the trigger event occurs the entity server finalizes the calculation of the HWM 260. If the agents subsequently send additional information the entity server will discard or otherwise dispose of the data and not take it into consideration in determination of the HWM.

Step 240 occurs when additional usage data arrives. The server does not perform the full calculation again, but instead carries out an approximation calculation using the data stored in 220 and adding this to additional usage data which has just arrived, as shown by in 270. A new approximate value of HWM is thus generated. The new approximate HWM and the updated set of additional data are stored by replacing the previous HWM and additional data 280. The HWM and additional data may be stored in any appropriate location, for example a database on the entity server, the software owner's server or elsewhere.

The entity server may receive still further additional usage data and will repeat the recalculation 270 described above. This can continue until the trigger event occurs 250. Each time, the data in the database is replaced by a new approximation of the HWM and a changing set of additional data 280. In certain situations, the set of additional data may increase or decrease in size if earlier versions are kept or disposed of, as the case may be. An alternative to this step of recalculating on arrival of new data is that a recalculation occurs periodically. For example, the recalculation occurs every hour, including in the calculation the usage data received in the previous hour. In any embodiment, there will be an appropriate location for storing and holding the incoming data before it is used.

At some point the trigger event occurs 250. This may be that a predefined time interval has elapsed, for example 15 days. At this point it is very unlikely that new usage data will arrive for the day in question. As a result, the server re-executes the processing performed at step 210. This entails loading all the usage data and calculating an exact HWM and storing this in the database step 260. In this case the set of additional data may not be computed or stored, because there will be no further need to update the HWM. If still further additional usage data for the day in question arrives, the server will discard this. The additional data may be stored as a set of any new data which has arrived since the last calculation, or may be an ever increasing set of all the additional data that arrives at whatever time. In each case, the storage will be appropriately effected and managed.

A historic record of the data at the beginning and as updated at each recalculation may be stored in the data base, for example, for use in checking comparisons of trends at a later date etc. Each subsequent set of additional data may also be stored, if needed.

A variant implementation can make 240, 260, 270 and 280 optional in the event no additional data is received after the initial calculation. In this case. 240, 260, 270 and 280 are never executed because new data never arrives and therefore, they need not take place. The final HWM is that which was calculated in 210 without the additional data because the original HWM is in fact an exact one.

HWM is not the only relevant metric, for example, for a license that is charged based on the number of machines where software has been used in a day, the number of machine used is saved after the initial calculation. This, to some extent, plays the role of the HWM in the other example. The additional data is made up of information about the identity of the machines. If new usage data arrive from a machine, the recalculation step may simply check to determine if that particular machine has already been included in the calculation (using the additional data) and if not the recalculation step will increase the final number of machines by an appropriate amount.

Each of the above described steps may be executed for each day for which data is required. Thus, it is possible that at the same time there are some days for which the processing is in 210 and others days which are at other steps in the process. Accordingly, there may be multiple processes running in parallel.

The system of the present invention calculates a function that represents how much software was used during a day and then uses the maximum peak (the High Water Mark) and additional data to revise the maximum peak if needed. In this way the highest level of use is obtained with a simplified recalculation technique based on updating the original HWM with additional data and approximation calculations.

The method described provides quick calculation of an incremental rough approximation of license usage for licenses requiring the computation of an HWM. The approximated value can be quickly provided to the user as a rough estimate of the license consumption, then modified and updated for a longer period of time, before a cut-off date when the license consumption is accurately calculated and then no longer modified.

The data, HWM or equivalent measurement metric as calculated above, is fed back to the license server. In this way a license having a daily aggregation period will have, for each day, an aggregation record composed of the following data: a consumption value of the software, a flag indicating if the consumption value is accurate or approximate which is generated at conclusion of 210 and 280 respectively, and a value for HWM for each time interval at which a recalculation has taken place.

In another embodiment of the invention, use of a threshold of events which initiate recalculation may be made. If more events than the threshold are received after the initial calculation, the next incremental calculation occurs based on the threshold having been met.

Although not specifically illustrated in FIG. 1, the functions carried out in the steps illustrated in FIG. 2 may be carried out by appropriate modules in one embodiment of FIG. 1. These modules may be associated with the entity sever, the software owner's server or elsewhere. For example, a calculation module may be used for the calculation or computation steps, a storage module may be used for the storage steps, a receiving module may be used for any reception of data, and other appropriate modules may provide the functions of the "wait event" and the "trigger event" and any comparison of monitored usage of software and licensed usage of software.

It should also be understood that the inventive concepts disclosed herein are capable of many modifications. To the extent such modifications fall within the scope of the appended claims and their equivalents, they are intended to be covered by this patent.

The invention claimed is:

1. A method of determining a level of use of a program associated with a license, the method comprising:
   receiving initial usage data from one or more of a plurality of agents, the initial usage data relating to one or more uses of the program during a first predetermined time period;
   calculating a value of a metric indicative of use of the program during the first predetermined time period based on the initial usage data;
   storing the calculated value of the metric and storing the initial usage data as current usage data;
   performing one or more recalculations of the value of the metric until a trigger event occurs, each recalculation being based on the stored current usage data and additional usage data received from one or more of the plurality of agents since a most recent calculation of the value of the metric, the additional usage data relating to one or more uses of the program during the first predetermined time period, each recalculation comprising:
      calculating a new value of the metric for the first predetermined time period based on the stored current usage data and the additional usage data;
      replacing the stored value of the metric with the new value of the metric, and
      updating the current usage data by adding the additional usage data thereto;
   upon occurrence of the trigger event, determining whether further additional usage data has been received since the most recent calculation of the value of the metric;
      on the condition that further additional usage data has been received, calculating a final value of the metric based on the current usage data and the further additional usage data to provide a final indication of the level of use of the program; and
   on the condition that further additional usage data has not been received, calculating a final value of the metric based on the current usage data, the calculated final value of the metric corresponding to the stored value of the metric,
   wherein the additional data usage is received over a number of separate events including over at least two separate events, and wherein the recalculation is performed when the number of separate events reaches a predetermined threshold.

2. The method of claim 1, further comprising sending the final value of the metric to a license owner to enable the license owner to generate a charge for use of the program.

3. The method of claim 1, wherein the trigger event is the elapsing of a third predetermined time period.

4. The method of claim 1, wherein the trigger event is a user generated input.

5. The method of claim 1, wherein the metric is a high water mark (HWM).

6. The method of claim 1, wherein the first predetermined time period is a time period selected from the group consisting of a day, a week, a month and a year.

7. The method of claim 1, wherein the one or more agents from which the initial usage data is received and the one or more agents from which the additional usage data is received include at least one common agent.

8. The method of claim 1, the recalculating a value of the metric comprising:
generating, from the current usage data and the additional usage data, a set of events corresponding to the one or more uses of the program, the generating the set of events comprising:
identifying, for each use of the program, a first event associated with the use, the first event corresponding to a beginning time of the use,
including the first event in the set of events,
determining, for each use of the program, whether a second event is associated with the use, and
on the condition that a second event is associated with the use, including the second event in the set of events;
ordering the set of events chronologically;
initializing a current value counter and a metric counter to zero; and
performing a processing of the set of events,
wherein:
the calculated value of the metric corresponds to a value of the metric counter after the processing of the set of events is complete, and
the processing comprises for each event in the set of events:
determining whether the event is the first event or the second event,
the processing further comprising on the condition that the event is the first event:
incrementing the current value counter by one,
comparing to the current value counter to the metric counter, and
setting the metric counter equal to the current value counter on the condition that the current value counter exceeds the metric counter, and
the processing further comprising on the condition that the event is the second event:
decrementing the current value counter.

9. A system for determining a level of use of a program associated with a license, the system comprising:
a processor; and
a computer memory operatively coupled to the processor;
wherein the computer memory has disposed therein:
computer program instructions for receiving initial usage data from one or more of a plurality of agents, the initial usage data relating to one or more uses of the program during a first predetermined time period;
computer program instructions for calculating a value of the metric indicative of use of the program during the first predetermined time period based on the initial usage data;
computer program instructions for storing the calculated value of the metric and for storing the initial usage data as current usage data;
computer program instructions for performing one or more recalculations of the value of the metric until a trigger event occurs, each recalculation being based on the stored current usage data and additional usage data received from one or more of the plurality of agents since a most recent calculation of the value of the metric, the additional usage data relating to one or more uses of the program during the first predetermined time period, each recalculation comprising:
computer program instructions for calculating a new value of the metric for the first predetermined time period based on the stored current usage data and the additional usage data,
computer program instructions for replacing the stored value of the metric with the new value of the metric, and
computer program instructions for updating the current usage data by adding the additional usage data thereto;
computer program instructions for determining, upon the occurrence of the trigger event, whether further additional usage data has been received since the most recent calculation of the value of the metric;
computer program instructions for calculating, on the condition that further additional usage data has been received, a final value of the metric based on the stored current usage data and the further additional usage data to provide a final indication of the level of use of the program; and
computer program instructions for calculating, on the condition that further additional usage data has not been received, a final value of the metric based on the current usage data, the calculated final value of the metric corresponding to the stored value of the metric,
wherein the additional data usage is received over a number of separate events including over at least two separate events, and wherein the recalculation is performed when the number of separate events reaches a predetermined threshold.

10. The system of claim 9, the memory further comprising computer program instructions for sending the final value of the metric to a license owner to enable the license owner to generate a charge for use of the program.

11. The system of claim 9, wherein the trigger event is the elapsing of a third predetermined period of time.

12. The system of claim 9, wherein the trigger event is a user generated input.

13. A computer program product for determining a level of use of a program associated with a license, the computer program product comprising:
a computer-usable medium having computer-readable code embodied thereon, the computer-readable code comprising:
computer program instructions for receiving initial usage data from one or more of a plurality of agents, the initial usage data relating to one or more uses of the program during a first predetermined time period;
computer program instructions for calculating a value of a metric indicative of use of the program during the first predetermined time period based on the initial usage data;
computer program instructions for storing the calculated value of the metric and for storing the initial usage data as current usage data;
computer program instructions for performing one or more recalculations of the value of the metric until a trigger event occurs, each recalculation being based on the stored current usage data and additional usage data received from one or more of the plurality of agents since a most recent calculation of the value of the metric, the additional usage data relating to one or more uses of the program during the first predetermined time period, each recalculation comprising:
computer program instructions for calculating a new value of the metric for the first predetermined time period based on the stored current usage data and the additional usage data,
computer program instructions for replacing the stored value of the metric with the new value of the metric, and computer program instructions for updating the current usage data by adding the additional usage data thereto;

computer program instructions for determining, upon the occurrence of the trigger event, whether further additional usage data has been received since the most recent calculation of the value of the metric;

computer program instructions for calculating, on the condition that further additional usage data has been received, a final value of the metric based on the stored current usage data and the further additional usage data to provide a final indication of the level of use of the program; and computer program instructions for calculating, on the condition that further additional usage data has not been received, the final value of the metric based on the current usage data, the calculated final value of the metric corresponding to the stored value of the metric, wherein the additional data usage is received over a number of separate events including over at least two separate events, and wherein the recalculation is performed when the number of separate events reaches a predetermined threshold.

* * * * *